UNITED STATES PATENT OFFICE.

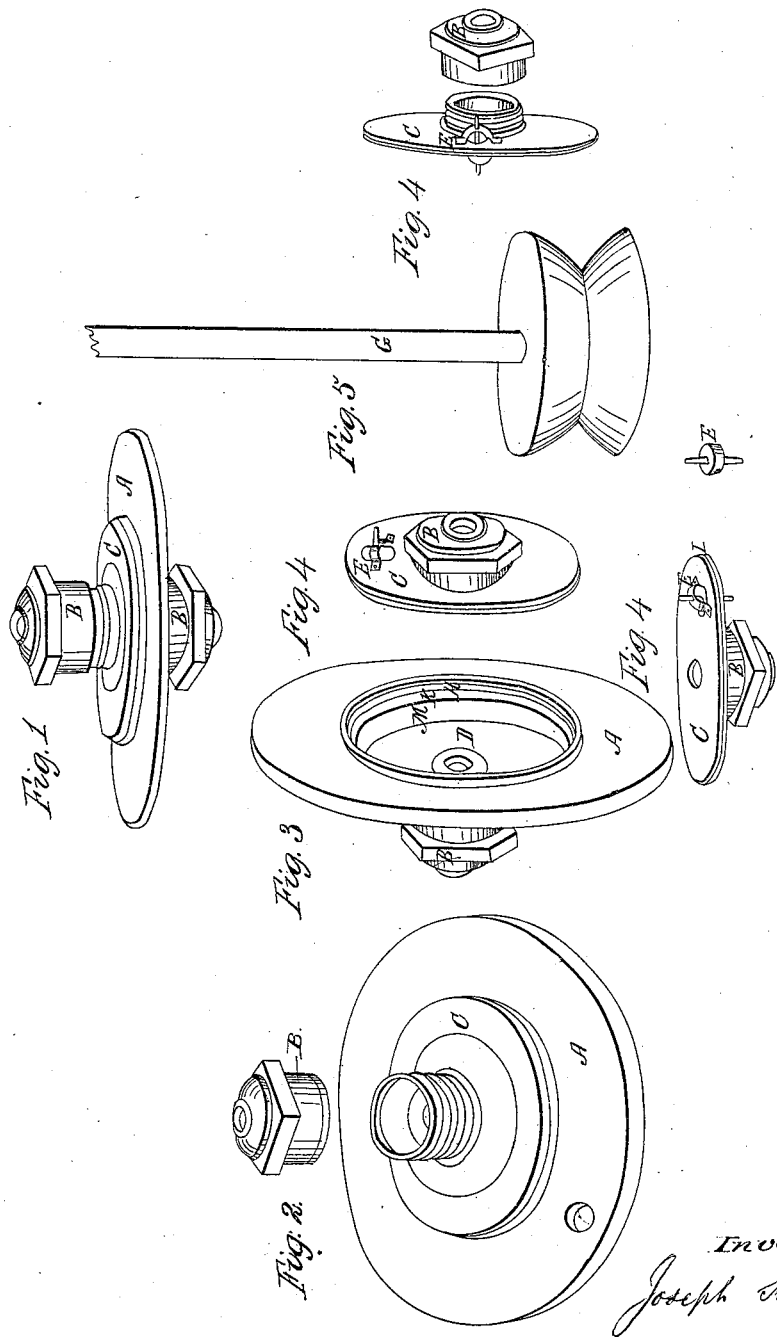

JOSEPH SMART, OF PHILADELPHIA, PENNSYLVANIA.

SELF-REGULATING WATER-PACKING FOR PUMPS, &c.

Specification of Letters Patent No. 13,233, dated July 10, 1855.

*To all whom it may concern:*

Be it known that I, JOSEPH SMART, of Philadelphia, in the county of Philadelphia and State of Pennsylvania, have invented a new and improved mode of preventing air passing through stuffing-boxes in double-acting lift and force pumps, thereby preventing the derangement of action in forming a vacuum on the downward stroke, as heretofore in other pumps; and I do hereby declare that the following is a full and exact description thereof.

Figure 1 in the drawing represents a perspective view of the cap when together. Fig. 2 represents the upper part of the cap and top stuffing box. Fig. 3 represents the inverted view of Fig. 2. Fig. 4 represents a round plate with bottom stuffing box attached. Fig. 5 represents a pump plunger and rod.

In the drawing like letters and figures refer to the like parts.

Letter A in Fig. 1 represents a flange or rim by which the cap is secured to the top of a pump chamber. Letters B B represent the stuffing boxes one above the cap and the other below. Letter C represents a reservoir to contain water.

Fig. 2 represents the upper part of cap with stuffing box attached as in Fig. 1.

Letters D M in Fig. 3 is an inverted view of reservoir; H a screw; K a screw bearing; C in Fig. 4 represents a round plate or bottom to the reservoir, I a male screw on its rim to be inserted into letter H to the bearing K, Fig. 3, thereby leaving a space M for the reservoir, B in Fig. 4 represents the lower stuffing box; E represents a small valve opening upward; F in Fig. 5 represents the plunge; letter G represents a plunge rod.

As all pumps depending upon stuffing boxes are necessarily imperfect from the fact that after being somewhat worn air will force itself in where water will not escape. The nature of my invention is to meet this difficulty. I have two stuffing boxes one above the cap as in the ordinary pump and the other beneath leaving a space or reservoir between the two for admission of water, which is supplied by a small valve placed on the plate of the lower stuffing box and opening inward as herein described. As a necessary consequence of this arrangement with every upward stroke of the pump a fresh supply of water is supplied completely filling the small reservoir between the stuffing boxes and effectually preventing the admission of any air to the working chamber.

What I claim as my invention and desire to secure by Letters Patent is—

The application to pump caps, two stuffing boxes so arranged one above the other leaving a space or reservoir between them, also the manner of supplying the same with water by means of a small valve on the lower plate or any other substantially the same which will produce the intended effect as herein described.

JOSEPH SMART. [L. S.]

Witnesse:
JOSEPH M. CALVEY,
ROBERT CURRY.